(12) United States Patent
Kenk

(10) Patent No.: US 11,395,716 B2
(45) Date of Patent: Jul. 26, 2022

(54) SYSTEM OF A GUIDE PIECE AND MILLING CUTTER

(71) Applicant: STRAUMANN HOLDING AG, Basel (CH)

(72) Inventor: Frank Kenk, Basel (CH)

(73) Assignee: STRAUMANN HOLDING AG, Basel (CH)

( * ) Notice: Subject to any disclaimer, the term of this patent is extended or adjusted under 35 U.S.C. 154(b) by 107 days.

(21) Appl. No.: 16/474,759

(22) PCT Filed: Dec. 5, 2017

(86) PCT No.: PCT/EP2017/081520
§ 371 (c)(1),
(2) Date: Jun. 28, 2019

(87) PCT Pub. No.: WO2018/121959
PCT Pub. Date: Jul. 5, 2018

(65) Prior Publication Data
US 2019/0336246 A1   Nov. 7, 2019

(30) Foreign Application Priority Data
Dec. 28, 2016  (EP) .................................... 16207034

(51) Int. Cl.
*A61C 3/02* (2006.01)
*A61C 1/08* (2006.01)
*A61C 8/00* (2006.01)

(52) U.S. Cl.
CPC ............ *A61C 1/084* (2013.01); *A61C 8/0089* (2013.01); *A61C 3/02* (2013.01)

(58) Field of Classification Search
CPC .. A61C 1/084; A61C 1/82; A61C 3/02; A61B 17/17–1796
(Continued)

(56) References Cited

U.S. PATENT DOCUMENTS 5,782,636 A   7/1998  Armstrong et al.
5,868,572 A   2/1999  Lazzara et al.
(Continued)

FOREIGN PATENT DOCUMENTS

JP   H06-125923 A   5/1994

OTHER PUBLICATIONS

Mar. 5, 2018 International Search Report issued in International Patent Application No. PCT/EP2017/081520.
(Continued)

*Primary Examiner* — Heidi M Eide
(74) *Attorney, Agent, or Firm* — Oliff PLC

(57) ABSTRACT

A milling cutter and guide piece, the milling cutter including an elongate shaft extending along a longitudinal axis and a distal end portion having a milling part including at least one circumferentially disposed cutting edge for removing bone tissue, the guide piece having a fixation element, for releasably fixing the guide piece to a support structure, and a longitudinal axis, wherein one of the guide piece and the distal end of the milling cutter includes a head having a central axis coaxial to the longitudinal axis of the one of the guide piece and the distal end of the milling cutter, and the other of the guide piece and distal end of the milling cutter includes a inner cavity extending along a central axis coaxial to the longitudinal axis of the other of the guide piece and the distal end of the milling cutter.

19 Claims, 5 Drawing Sheets

(58) Field of Classification Search
USPC .......................................... 408/199; 407/53
See application file for complete search history.

(56) References Cited

U.S. PATENT DOCUMENTS

| | | | |
|---|---|---|---|
| 8,529,259 B2* | 9/2013 | Wade ................. | A61C 17/0202 |
| | | | 433/166 |
| 10,016,256 B2* | 7/2018 | Simmons, Jr. ....... | A61C 8/0089 |
| 2010/0114323 A1* | 5/2010 | Deruntz ............. | A61B 17/1675 |
| | | | 623/20.21 |

OTHER PUBLICATIONS

Mar. 5, 2018 Written Opinion issued in International Patent Application No. PCT/EP2017/081520.
Jun. 8, 2017 Search Report issued in European Patent Application No. 16207034.6.

* cited by examiner

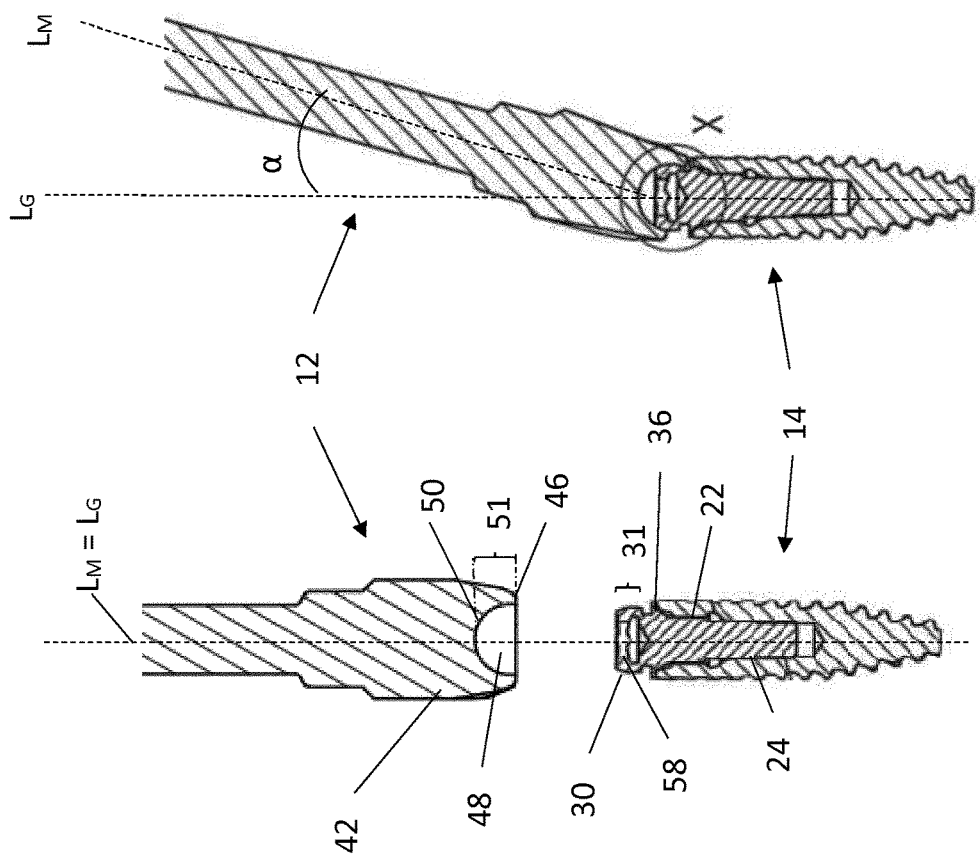
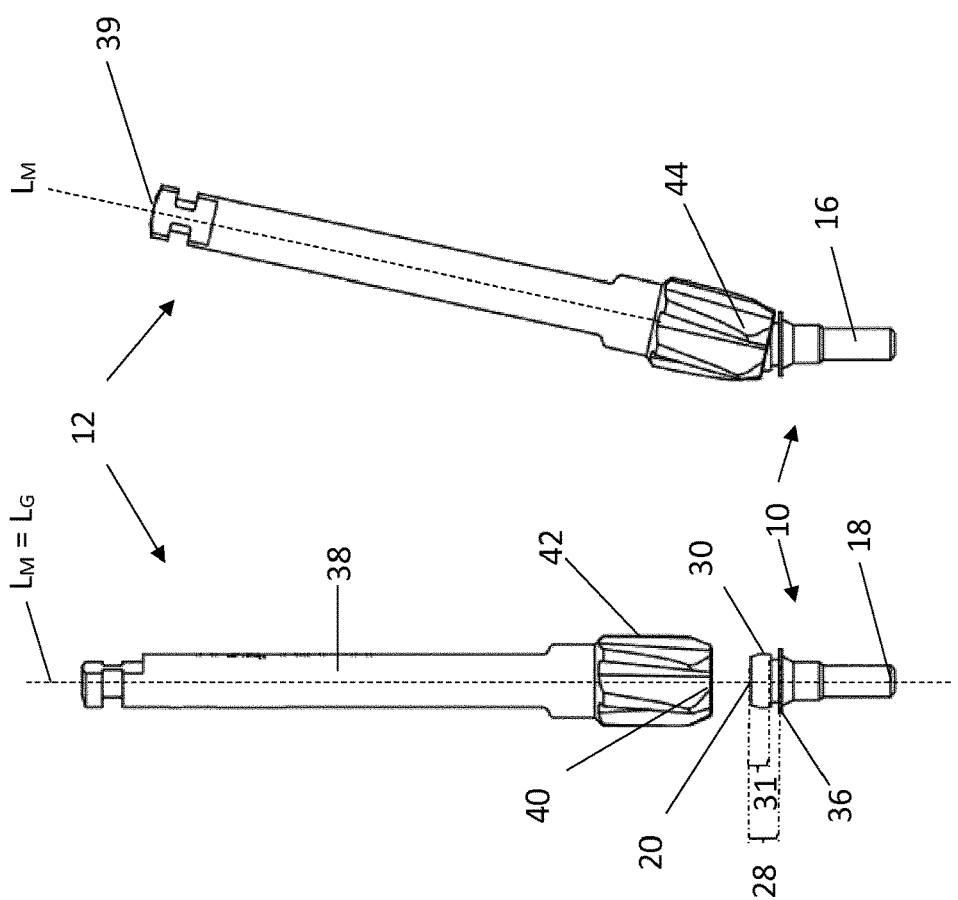

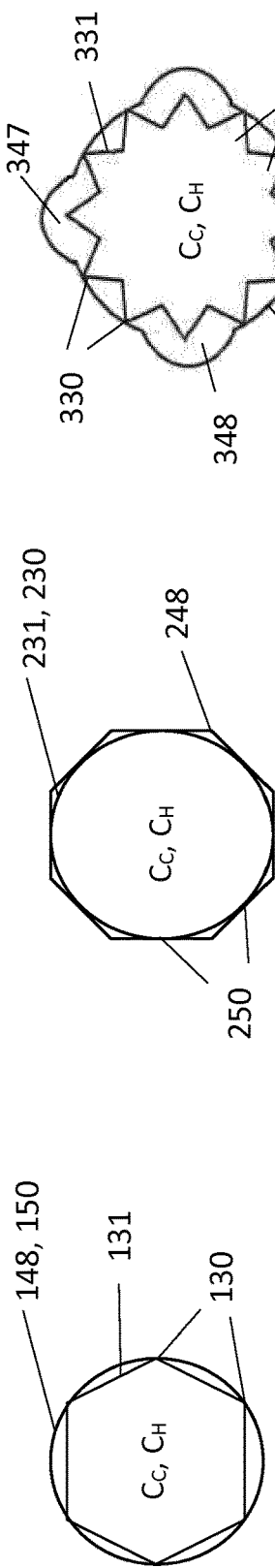
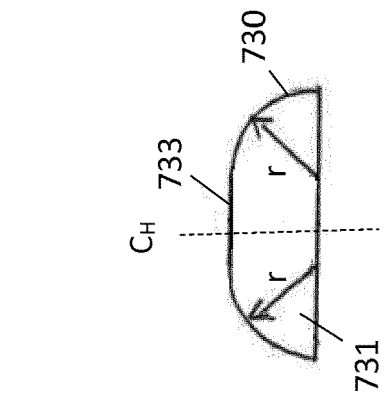
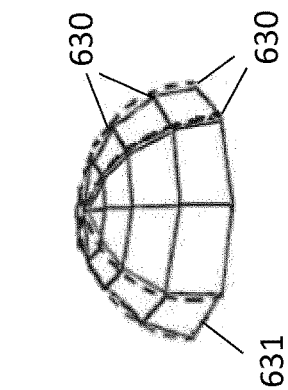
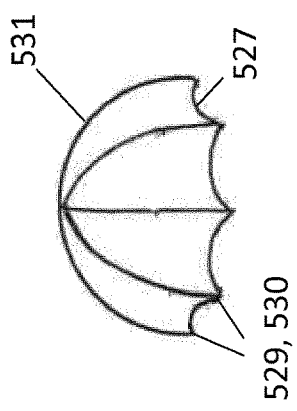
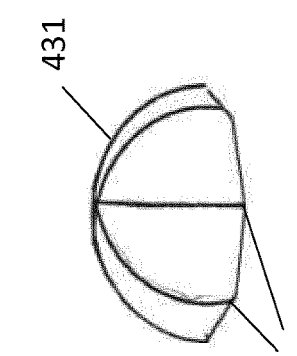

SYSTEM OF A GUIDE PIECE AND MILLING CUTTER

TECHNICAL FIELD

The invention relates to a system of a guide piece and a milling cutter, in particular a bone profiler milling tool, for use in the field of dentistry.

BACKGROUND

Dental implants are used to replace one or more teeth in a patient's mouth. Implants have two essential parts: an anchoring part and an abutment part. The anchoring part is embedded in the bone, where it osseointegrates with the bone tissue to provide a firm anchor for the prosthesis. The abutment extends into the oral cavity and provides a support for the prosthesis. The desired prosthetic element (e.g. bridge or crown) is fixed over the abutment.

The implant can be constructed in one part, such that the anchoring part and abutment part are produced in one integral piece. However, implants are more commonly constructed in two or more parts, in which case they consist of at least an anchoring component, often referred to in isolation as the implant, and a separate abutment, sometimes referred to as a spacer. Such two part implants are generally preferred as they offer the dentist more flexibility in treatment options. The anchoring component is usually either embedded completely in the bone, that is to say to the height of the alveolar crest, or protrudes by a few millimetres from the alveolar crest into the soft tissue. The abutment is mounted either directly or indirectly to the anchoring component after the latter has incorporated (osseointegrated) into the bone, or directly after the anchoring component has been inserted. It can also be attached to the anchoring component prior to insertion. Most usually the abutment is not mounted until after osseointegration. In such cases a component called a healing cap is often mounted to the anchoring component during the osseointegration process to prevent incursion of soft tissue over the implant site. During the course of preparing the final prosthesis, several other well-known components are often attached to the anchoring component, such as an impression cap, or post, and a temporary abutment.

To distinguish between one and two part implants, for the remainder of this specification and unless specifically stated to the contrary, the term "implant" will be used to refer to the anchoring component of a multi-part implant whereas the term "one piece implant" or "one part implant" will be used to refer to an integral anchoring and abutment part.

Implants designed to be placed fully within the bone, such that they end at the upper level of the patient's jawbone, are known as "bone level" implants.

When a bone level implant is placed within the bone it is possible that bone may extend above the top of the implant. This can occur for example due to too deep placement of the implant, an uneven bone crest or when the implant is placed at an angle within the jaw. The bone above the implant can prevent the correct attachment of abutments and other components (e.g. healing caps, impression posts) to the implant.

It is therefore known to use bone profilers to shape the bone above the coronal edge of the implant, in order to allow for the proper seating of healing caps, prosthetic components, impression copings and temporary and final abutments.

According to a known procedure, a guiding cylinder is connected to the implant in order to guide the path of a bone profiler. The guiding cylinder comprises a solid cylindrical body, which protrudes coronally from and co-axially to the implant. The bone profiler comprises a conically shaped milling bit, tapering outwards in the coronal direction. The milling bit is hollow with the central cavity being sized to fit over the cylindrical body of the guiding cylinder, in order to align the bone profiler with the guiding cylinder. In this way, the bone profiler can be accurately positioned relative to the implant and a conical volume of bone above the coronal edge of the implant can be removed. A stop shoulder of the guiding cylinder limits the depth to which the milling bit can be inserted and hence protects the implant.

In accordance with conventional dental terminology, "apical" refers to the direction towards the bone and "coronal" to the direction towards the teeth. Therefore, the apical end of a component is the end which, in use, is directed towards the jaw bone and the coronal end is that which is directed towards the oral cavity.

U.S. Pat. No. 5,782,636, discloses a bone contouring tool for removing bony tissue surrounding an implanted dental implant. The contouring tool has blade means formed at one end and a pilot pin integrally formed therewith and extending downwardly of said blade means. The pilot pin is insertable into the implant to align the contouring tool with the dental implant and to guide the blade means around the perimeter of said implant during removal of bone tissue. Afterwards pilot pin and the contouring tool are simultaneously removed.

Within the dental implant field there is a move to provide abutments and other components having cross-sections that more accurately mimic the shape of natural teeth, e.g. oval, triangular etc. However, the existing bone profilers are only able to create bores which are circular symmetric about the longitudinal axis of the guiding cylinder (which is itself coaxial with the implant). Consequently, when a non-circular-symmetric abutment is to be placed on the implant, the bore prepared by existing bone profilers will not match the abutment shape and excess bone must be removed in order to enable the abutment, or other anatomically shaped component, to be placed on the implant. A similar problem exists when creating a bore in the bone for placement of an asymmetric implant (either one- or multi-piece).

As such, there is a need to provide a milling cutter that enables the creation of a non-circular-symmetric hole within the bone to match a non-circular symmetric dental component.

SUMMARY

This object is achieved by a system according to at least a preferred embodiment disclosed herein of claim 1.

According to one aspect, the present invention provides a system comprising a milling cutter and a guide piece. The milling cutter comprises an elongate shaft extending along a longitudinal axis and a distal end portion having a milling part comprising at least one circumferentially disposed cutting edge for removing bone tissue. The guide piece has a fixation element, for releasably fixing the guide piece to a support structure, and a longitudinal axis. One of the guide piece and the distal end of the milling cutter comprises a head having a central axis coaxial to the longitudinal axis of said one of the guide piece and the distal end of the milling cutter, and the other of the guide piece and distal end of the milling cutter comprises an inner cavity extending along a central axis coaxial to the longitudinal axis of said other of the guide piece and the distal end of the milling cutter. Said head comprises a guide portion having a bearing surface which is convexly rounded in the axial plane of the head, and said cavity comprises a guiding portion having an abutting surface which is concave in the axial plane of the cavity. Said bearing and abutting surfaces are circular symmetric about their central axes. The cavity is sized and shaped to receive the guide portion of the head such that the convexly rounded bearing surface and concave abutting surface contact one another so as to permit simultaneous relative rotational movement between the head and the cavity about their central axes and pivoting of the longitudinal axis of the milling cutter with respect to the longitudinal axis of the guide piece.

Thus, the present invention provides a milling system with a new form of guidance, in which, rather than a cylindrical guide, a ball joint connection between the guide and milling cutter is provided. One of the milling cutter and guide piece, e.g. the guide piece, comprises a head comprising a guide portion having a convexly rounded bearing surface, while the other component, e.g. the milling cutter, comprises an inner cavity which can be positioned over the guide portion of the head such that the latter is disposed within the cavity. In this engaged position, i.e. when the guide portion of the head is received within the inner cavity such that the cavity's concave abutting surface abuts the convex bearing surface of the head, the milling cutter can be rotated about its longitudinal axis and, simultaneously, pivoted around the longitudinal axis of the guide piece. The head and the cavity, therefore, act as a ball joint to enable the dentist to create a non-circular symmetric hole within the bone. Thanks to the pivotal freedom of the milling cutter, the hole formed in the bone can be individually adjusted to substantially match the contour of any dental component, including those components which are not circular symmetric with respect to the longitudinal axis thereof, such that the dental component fits snugly into the hole. In other words, not only circular symmetrical holes can be milled, but also holes with, e.g., an oval or irregular cross-section. In addition, the depth of the bore milled by the system of the present invention can vary around the longitudinal axis of the guide piece, depending on the degree of angular deviation of the milling cutter from the longitudinal axis of the guide piece. To give a specific example, the system of the present invention allows the dentist to cut a hole with an oval cross-section into the bone, wherein the hole is cut deeper into the bone in an area on the buccal and/or lingual side.

According to the present invention, the inner cavity is sized and shaped to accommodate the guide portion of the head such that the concave abutting surface of the cavity abuts and is both rotationally and pivotably moveable relative to the convex bearing surface of the head. In the context of the present invention, reference to rotation of the milling cutter refers to rotation about the longitudinal axis of the milling cutter, whereas reference to pivoting or pivotal movement refers to the angular deviation of the longitudinal axis of the milling cutter relative to the longitudinal axis of the guide piece.

Relative rotational movement between the head and the cavity is made possible as both the bearing and abutting surfaces are circular symmetric about their central axes. The two surfaces can thus each freely rotate about their central axis while remaining in contact with one another.

Pivotal movement of the milling cutter with respect to the guide piece is made possible by the convexly rounded cross-section of the bearing surface in the axial plane of the head, that is to say, in a plane co-planar to the central axis of the head. This allows the milling cutter to pivot relative to the guide piece while the bearing and abutting surfaces are in contact with one another.

In some embodiments, one or both of the bearing surface and abutting surface may be discontinuous about their central axis and/or in a plane coplanar to their central axis. That is to say, the bearing and/or abutting surface may be interrupted by grooves, indentations etc., such that the bearing and/or abutting surface is formed by circumferentially and/or axially spaced points or segments on the guide portion of the head or guiding portion of the cavity, respectively.

A circumferentially discontinuous bearing and/or abutting surface can be provided, for example, by the guide portion of the head and/or the guiding portion of the cavity having a polygonal, e.g. triangular, square, pentagonal, hexagonal, heptagonal or octagonal, cross-section in a plane perpendicular to its central axis (transverse cross-section). Alternatively, a circumferentially discontinuous surface can be formed by the guide portion of the head and/or the guiding portion of the cavity having a, e.g., cross, Torx® screw drive, or "bicycle spoke" cross-section perpendicular to its central axis. Such cross-sections provide a circumferentially discontinuous bearing and/or abutting surface formed by a plurality of circumferentially discrete points or segments on the surface of the guide and/or guiding portion. In the case of the bearing surface, the above described cross-sectional shapes relate to the external contour of the guide portion of the head, whereas for the abutting surface, the above described cross-sectional shapes relate to the circumferential boundary of the guiding portion of the cavity.

An axially discontinuous bearing and/or abutting surface can be provided, for example, by the guide portion of the head and/or the guiding portion of the cavity having a faceted or stepped profile in a plane coaxial to its central axis. Such cross-sections provide an axially discontinuous bearing and/or abutting surface formed by a plurality of axially discrete points or segments on the surface of the guide and/or guiding portion. In the case of the bearing surface, these discrete points or segments lie on an arc such that the convexly rounded nature of the bearing surface is preserved. In the case of the abutting surface, the axially discrete points or segments can lie on an arc or may alternatively form points on, e.g. a cone or cylinder or other concave shape.

As the bearing surface can be discontinuous, many geometrical forms of guide portion of the head are possible. For example, the guide portion of the head may have an octagonal, or other polygonal, cross-section in a plane perpendicular to its central axis (transverse cross-section) and an arc-shaped, inset, stepped or faceted cross-section in the axial plane of the head. Alternatively, the guide portion of the head may be formed by a number of circumferentially spaced, radially extending spokes joined by variously shaped webbing, so as to form a transverse cross-section having, e.g. a star, flower or "bicycle wheel" shape, while the axial cross-section of the spokes can be arc-shaped, inset, stepped or faceted in shape. When the guide portion of the head comprises spokes, or a polygonal cross-section, having an arced axial cross-section, it can be said to have a generally "umbrella" shape. When the guide portion of the head comprises spokes, or a polygonal cross-section, having an inset axial cross-section, it can be said to have a generally "pine cone" shape. A head comprising radially extending spokes in the transverse cross-section can be advantageous when the head is formed on the guide piece and the fixation element of the guide piece comprises a thread, as the grooves formed between the spokes may be engageable by a suitable tool in order to rotate the guide piece and thread this to the support structure.

As the abutting surface can be discontinuous, many geometrical forms of guiding portion of the cavity are also possible. In a similar manner to the guide portion of the head, the guiding portion of the cavity may have an octagonal, or other polygonal, cross-section in a plane perpendicular to its central axis (transverse cross-section) and an arc-shaped, inset, stepped or faceted cross-section in the axial plane of the cavity. Alternatively, the guiding portion of the cavity may have a generally spherical, toroidal, circular cylindrical or conical surface interrupted by axially and/or circumferentially extending grooves.

When the bearing and/or abutting surface is discontinuous, it is of course essential that, over the axial extent of the guide portion of the head, the bearing surface forms the outermost radius of the head, while, over the axial extent of the guiding portion of the cavity, the abutting surface forms the innermost radius of the cavity. This ensures that the bearing and abutting surfaces can contact one another and perform their given function, namely relative rotational and pivotal movement.

In embodiments in which both the bearing and abutting surfaces are discontinuous about their central axes, it is preferred that the surfaces are designed such that, during the course of one complete revolution of the surfaces relative to one another, contact between the surfaces at some point over their circumference is always maintained. This can be achieved, for example, by the circumferential extent of each section of the bearing surface being greater than the circumferential extent of the distance between sections of the abutting surface. This ensures that, during rotation, the bearing and abutting surfaces are always in contact and thus creates a better guidance.

Preferably, at least either the guide portion of the head or the guiding portion of the cavity is circular symmetric about its central axis, and thus forms a bearing surface or abutting surface respectively which is continuous about its central axis. By providing a such a continuous circular symmetric bearing or abutting surface, a smooth contact can be maintained between the surfaces during rotation of the milling cutter and prevents jumping, wobbling or rattling of the milling cutter on the guide piece.

In general, a greater number of points of contact between the abutting and bearing surfaces is preferred in order to create a smoother guidance. Thus, in the situation in which the abutting surface is continuous about its central axis and the bearing surface is formed by a guide portion having a polygonal transverse cross-section, or vice versa, with the guiding portion having a polygonal transverse cross-section, an octagon or decagon would be preferred over, e.g. a triangle. Most preferably however, both the guide portion of the head and guiding portion of the cavity are circular symmetric about their central axes, thus forming a bearing surface and abutting surface respectively which are continuous about their central axis. This provides the best possible surface-to-surface contact about the complete circumference of the guide and guiding portions and thus provides optimal rotational guiding to the milling cutter.

In order to provide a smooth pivoting movement between the milling cutter and the guide piece, it is preferred that at least either the abutting surface or the bearing surface is continuous in the axial plane over the axial extent of the guiding portion of the cavity or the guide portion of the head respectively. In other words, the bearing surface forms a continuous surface in the axial plane of the head between the proximal and distal ends of the guide portion of the head, and/or the abutting surface forms a continuous surface in the axial plane of the cavity between the proximal and distal ends of the guiding portion of the cavity. Most preferably, both the bearing surface and abutting surface are continuous in their respective axial planes over the axial extent of the guide portion of the head and the guiding portion of the cavity respectively. This provides the best possible surface to surface contact and thus provides optimal pivotal guiding to the milling cutter.

In accordance with the present invention, the bearing surface of the head has a convexly rounded cross-section in the axial plane of the head, that is to say in a plane coplanar to the central axis of the head. While it is possible for the bearing surface to have an, e.g., oval axial cross-section, it is preferable that the cross-section of the bearing surface in the axial plane of the head forms an arc of curvature having a radius r. This allows the largest degree of pivotal freedom of movement of the milling cutter over the guide piece. In such embodiments, it is not essential that the arc of curvature is centred on the central axis of the head. Instead, the centre of the arc of curvature could be radially offset from the central axis, such that the bearing surface is toroidal in shape, i.e., it forms a part of a torus. For simplicity, however, it is preferable that the arc of curvature of the bearing surface is centred on the central axis of the head. This eases the number of design considerations that must be taken in to account when designing the cooperating bearing and abutting surfaces.

In some embodiments, as discussed above, the bearing surface may be discontinuous in the axial plane of the head. Preferably however, the bearing surface is continuous in the axial plane of the head over the axial extent of the guide portion. This eases manufacturing and provides a continuous pivotal guide surface over the axial extent of the guide portion. In such embodiments therefore, the guide portion of the head has a convexly rounded cross-section in the axial plane of the head, preferably forming an arc of curvature having a radius r.

For ease of manufacturing and to ensure the smoothest guidance, the bearing surface is preferably continuous about its central axis and over the axial extent of the guide portion of the head. This can be achieved, for example, by the guide portion of the head having a spherical or toroidal shape.

In a particularly preferred embodiment, the guide portion of the head is spherical in shape, thus forming a spherical bearing surface over the axial extent of the guide portion. The guide portion of the head can take the form of a spherical cap, such as a hemisphere. In such embodiments, the guide portion, and resulting bearing surface, forms a rounded dome. However, it is preferable that the guide portion of the head forms a spherical segment, that is, the surface of a sphere contained within two parallel planes such that the sphere is truncated in both the apical and coronal direction. Thus, in this embodiment, the guide portion, and resulting bearing surface, is a spherical frustum, or frustospherical. This reduces the height of the guide portion. In addition, when the head is formed on the guide piece, a guide portion in the form of a spherical segment can create an area at the coronal end of the guide piece which can be used to form a drive recess for cooperation with a screwdriver, or to form the coronal end of a through bore, as will be discussed further below.

According to the present invention, the abutting surface of the guiding portion of the cavity is concave in the axial plane of the cavity, that is to say, in a plane coplanar to the central axis of the cavity. In some embodiments, the abutting surface may comprise, e.g. a conical or cylindrical axial cross-section. While such abutting surfaces enable the cavity to be rotated and pivoted relative to the rounded convex bearing surface of the head, it is nevertheless preferable that the abutting surface of the cavity is concavely rounded in the axial plane of the cavity. In other words, the abutting surface has a rounded concave axial cross-section. This provides a greater surface contact between the bearing and abutting surfaces and thus a better guidance of the milling cutter during operation.

The bearing surface of the head and the abutting surface of the cavity preferably have a matching curvature in their respective axial planes. In this way, the surfaces can precisely contact one another, which leads to a smooth pivoting guidance of the milling cutter.

As discussed above, the abutting surface can be discontinuous in the axial plane, such that the abutting surface is formed by axially discrete points or segments of the guiding portion of the cavity. Preferably however, the abutting surface is continuous in the axial plane over the axial extent of the guiding portion of the cavity.

For ease of manufacturing and to ensure the smoothest guidance, the abutting surface is preferably continuous about its central axis and over the axial extent of the guiding portion of the cavity. This can be achieved, for example, by the guiding portion of the cavity having a circular cylindrical, spherical, toroidal or conical shape.

As discussed above, in preferred embodiments the abutting surface of the cavity has a matching curvature to the bearing surface of the head. Thus, in particularly preferred embodiments, the guiding portion of the cavity and the guide portion of the head have matching spherical or toroidal shapes.

In one preferred embodiment the guiding portion of the cavity is spherical in shape, thus forming a spherical abutting surface over the axial extent of the guiding portion. In this embodiment, the bearing surface of the head preferably has a matching convex spherical curvature.

Preferably the guiding portion forms a concave spherical cap, preferably a hemisphere. In this embodiment, the bearing surface could be discontinuous, or form a continuous spherical cap, but preferably, as described above, the guide portion of the head, and resulting bearing surface, forms a spherical segment.

According to the present invention the cavity and head can be located on either the guide piece or the milling cutter. The central axes of the cavity and head are coaxial with the longitudinal axis of whichever component they are located on. For example, the guide piece may comprise the inner cavity. In this case the central axis of the cavity is coaxial to the longitudinal axis of the guide piece. In such embodiments the distal end of the milling cutter will comprise the head, the central axis of the head being coaxial to the longitudinal axis of the milling cutter.

Preferably, however, the distal end of the milling cutter comprises said inner cavity extending along a central axis coaxial to the longitudinal axis of the milling cutter, while the guide piece comprises the head having a central axis coaxial to the longitudinal axis of the guide piece. This configuration enables the resulting ball joint to be located within the distal end of the milling cutter, and hence the at least one cutting edge axially overlaps the pivot point of the system. In the alternative embodiment, in which the cavity is located in the guide piece, the cutting edge(s) will be located above, i.e. coronal of, the pivot point. This can reduce the amount of contact the milling cutter has with the bone. In this embodiment, in order to compensate for this and increase the depth of contact with the bone, the pivot point must be located lower, i.e. more apical, in relation to the guide piece and support structure. In many preferred embodiments, however, as will be discussed below, the guide piece is fixed in use to a dental implant or within a pre-drilled bore hole sized to accommodate such an implant. These implants, and hence their accommodating bores, necessarily have a small diameter. When the cavity is located apically in the guide piece therefore, the footprint available for the cavity is small and can lead to a structurally weak ball joint. Thus, it is preferable to locate the ball joint within the milling cutter by creating the cavity in the distal end of the milling cutter and the head on the guide piece.

According to the present invention, the milling part comprises at least one circumferentially disposed cutting edge for removing bone tissue. Preferably, in order to increase the cutting ability of the milling cutter, the milling part comprises a plurality of circumferentially disposed cutting edges for removing bone tissue, most preferably between 2 and 8 evenly circumferentially spaced cutting edges.

The milling part can be cylindrically or conically shaped, or rounded, in the axial plane of the milling cutter. Preferably, the milling part comprises a first cutting section located at the distal tip of the milling cutter having at least one circumferentially disposed lateral cutting edge, the cutting edge tapering radially outwards in the proximal direction. Such a cutting section allows the formation of a tapered hole in the bone. This is beneficial as it enables the milling cutter to cut bores which taper outwards towards the alveolar crest. This allows the dental components seated within the resulting bore to have a more natural "emergence profile". Additionally, the tapered configuration of the first cutting section allows for bone chips to be cleared away from the cutting site during the milling operation. This helps provide the surgeon with an unobstructed view during cutting of bone tissue and further helps to minimize unwanted heat generation. Although the primary function of the milling cutter is to remove bone around a pre-drilled hole, and thus the cutting edge(s) is disposed on the circumference of the milling part, preferably at least one cutting edge is formed on the distal end of the milling cutter. This can assist in the removal of bone during pivoting of the milling cutter.

While the milling part may comprise only this first cutting section, the milling part preferably further pivotal movement of the milling cutter, wherein a neck of larger diameter limits the pivoting of the milling cutter at a smaller angle than a neck of smaller diameter. However, as discussed above, it is preferred that the stop surface of the head is provided by an annular shoulder. Therefore, in a particularly preferred embodiment, the head comprises a guide portion, a neck proximally adjacent to the guide portion having a diameter which is smaller than the diameter of the proximal end of the guide portion, thereby forming an undercut and, proximally adjacent to said neck, an annular shoulder having a diameter greater than the maximum diameter of the guide portion. In a particularly preferred embodiment, said head is located on the guide piece.

According to the present invention the head comprises a fixation element for releasably fixing the guide piece to a support structure. The fixation element of the guide piece can be any element which enables the guide piece to be attached, either directly or indirectly, to an underlying support structure.

The guide piece and milling cutter of the present invention could be used, for example, when drilling a hole in the bone for accommodating an irregularly shaped implant. In such circumstances, the guide piece can be fixed within a pre-drilled bore hole and the milling cutter used to widen the coronal portion of the bore, such that an implant with an oval, triangular or other irregular neck shape can be placed within the bore. In such embodiments the implant may be a one piece implant or the anchoring part of a two piece implant. Thus, in these embodiments, the fixation element is adapted to releasably fix the guide piece to a bore hole in the bone.

Preferably, however, the guide piece and milling cutter of the present invention are adapted for shaping the bone lying coronal of an in-situ bone level implant. In such embodiments, the fixation element of the guide piece is adapted to releasably fix the guide piece to an implant.

The anchoring components of multi part implants comprise, at their coronal ends, connection means for enabling other components of the system, e.g. abutments, to be firmly and non-rotationally fixed to the implant. Most usually, the implant comprises an aperture extending along the longitudinal axis of the implant. Alternatively, or in addition, the coronal end of the implant may comprise an axially protruding boss.

A guide piece designed for use with an implant comprising such a boss may comprise a fixation element comprising a complementary cavity that enables the guide piece to be positioned over the boss. Depending on the implant and guide piece design, the guide piece can be releaseably held on the boss by friction or snap fit (for example, if the boss comprises a suitable undercut) or cement.

The majority of bone level implants, however, do not comprise axially protruding bosses.

Therefore, in a preferred embodiment, the guide piece comprises a body portion, the body portion comprising the fixation element. The body portion could be designed for insertion into a pre-drilled bore hole within the bone, however, preferably, this is designed for insertion into the aperture of an implant.

The fixation element could comprise a flexible arm for forming a snap or friction fit with the aperture of the implant, or one or more radially extending pin for forming a bayonet lock. Alternatively, the fixation element may comprise a tapered section for forming a friction fit with an implant aperture having a cooperating taper. However, preferably, the fixation element comprises a threaded section for screw connection to an implant. Preferably, the threaded section comprises a male thread.

Alternatively to the above embodiments, the guide piece may comprise a through hole such that it can be fastened to the implant by a separate screw component. In this latter variation, the fixation element comprises a through bore that enables a separate screw to pass through the guide piece and threadedly connect to a threaded aperture within the implant. A screw seat is provided either within the through bore or by the coronal end of the guide piece.

When the guide piece is intended for direct insertion into the bone, the body portion may also comprise a threaded section or other fixation element, e.g. taper, in order to removeably anchor this in the bone while the component is in use.

In some embodiments the body portion of the guide piece may include an anti-rotation feature, e.g. a section having a polygonal cross-section, for engagement with a matching anti-rotation feature, e.g. an internal polygon —such as, e.g. an octagon, provided in the aperture of the dental implant. In such embodiments, the fixation element cannot comprise a threaded section but may comprise, e.g. a snap feature or taper. Alternatively, where an anti-rotation feature is present on the body of the guide piece, it is preferred that the fixation element comprises a through bore as described above. This enables a separate screw element to pass through the guide piece and secure this to the dental implant.

The body portion of the guide piece may comprise, coronal to the fixation element, a conical section. The conical section can provide a smooth transition from the body portion to the head or cavity. When the guide piece comprises the internal cavity, the conical section can increase the volume within which the cavity can be created.

When the guide piece is arranged to fasten to an implant and comprises an annular shoulder, the underside of this shoulder can also act to limit the insertion depth of the guide piece into the aperture in the dental implant.

The annular shoulder can therefore serve three purposes: to provide a stop for limiting penetration of the guide piece into the aperture of the dental implant, for limiting the pivot angle of the milling cutter with reference to the guide piece and for protecting the dental implant from the cutting action of the milling cutter. These three purposes can be provided independently of one another. Thus, it is possible for example to have a guide piece comprising a head, the head comprising an annular shoulder, wherein the annular shoulder does not form first stop surface for cooperation with the milling cutter but instead is provided in order to protect the coronal end of the implant and/or limit the insertion depth of the guide piece.

In a particularly preferred embodiment, the guide piece comprises a body portion having a fixation element, preferably a threaded section, for releasably securing the guide piece to a dental implant and, coronal of the body portion, a head, the head comprising at its coronal end a guide portion having a bearing surface, the head further comprising a neck portion located directly apical of the guide portion and having a diameter which is smaller than the apical end of the guide portion, thus forming an undercut, and, apically adjacent to the neck portion a radially extending annular shoulder having a diameter greater than the maximum diameter of the guide portion. Preferably, the bearing surface, and more preferably the guide portion, has the shape of a spherical segment. This results in the coronal end of the head having a planar surface with a circular transverse cross-section. Preferably, the coronal end of the head comprises a blind bore having a non-circular symmetric cross-section, such as, e.g. a polygonal or Torx® screw drive shape. This blind bore forms a drive recess which can be engaged by a screw driver to fasten the guide piece to an implant.

More generally, in all embodiments in which the fixation element comprises a threaded section, the coronal end of the guide piece preferably comprises a blind bore having a non-circular symmetric cross-section, preferably in the form of an polygon, most preferably a hexagon, or Torx® screw drive shape. Standard EN DIN ISO 10664 describes a corresponding internal hexagon or Torx® screw drive shape for screws and is hereby incorporated by reference. The blind bore can thus be releasably connected to a matching drive means on a torque imparting tool, such as a screwdriver, to rotate the guide piece. Torque imparting tools, suitable for transferring a torque to a screw with an internal hexagon or Torx® screw drive shape, are likewise specified in standard EN DIN ISO 10664 for example and are hereby incorporated by reference.

When the guide piece comprises the cavity of the present invention, the above described blind bore can be formed within the cavity, either proximal to, distal to, or in axial alignment with the abutting surface of the guiding portion. In this latter case the abutting surface will be discontinuous about the central axis of the cavity. When the guide piece comprises the head, the blind bore can be formed at the coronal end of the head. A guide portion in the form of a spherical segment can provide a suitably sized coronal end in which the blind bore can be formed.

According to a preferred embodiment, the blind bore is adapted for receiving torque from the same drive tool that will later be used to attach a secondary component, in particular an abutment or healing cap, to the dental implant.

In general, according to the present invention, the guide piece is preferably integrally formed in one piece. Manufacturing the guide piece as a monolithic piece avoids the formation of micro-gaps into which fluids, dirt etc. can enter and in which bacteria may propagate. In addition, the provision of an integrally formed guide piece facilitates the production thereof and increases its stability.

For the same reasons, it is preferable that the milling cutter is integrally formed in one piece.

In addition to the milling part, the milling cutter preferably further comprises, at its proximal end, connection means for axially and rotationally fixing the milling cutter to a torque transmitting device, such as a dental hand piece. The connection means can be, for example, an ISO standard latch.

In a preferred embodiment, in which the head is formed on the guide piece, the guide piece has an overall length of mm to 10 mm, preferably of 5 mm to 8 mm. The head portion is preferably 1 to 3 mm tall. The bearing surface has a maximum diameter of preferably 1.5 mm to 3.5 mm, and in particular of about 2.4 mm.

The components of the inventive system can be prepared from any biologically acceptable materials suitable for medical applications, including metals, plastics and ceramics. It goes without saying that the components can be made from different materials or all from the same material. Examples of preferred materials are commercially available stainless steel, titanium and titanium alloys. The milling cutter and/or the guide piece of the inventive system may also be fabricated from a combination of two or more of the above-described materials.

In a preferred embodiment the system of the present invention further comprises an implant having a longitudinally extending aperture, wherein the fixation element of the guide piece is adapted to releasably fix the guide piece to the implant, in accordance with one or more of the preferred embodiments discussed above.

BRIEF DESCRIPTION OF THE SEVERAL VIEWS OF THE DRAWINGS

Preferred embodiments of the system according to the invention will now be described, by way of example only, with reference to the accompanying drawings, in which:

FIG. 1A shows a perspective view of a preferred embodiment of a guide piece and a milling cutter according to the present invention;

FIG. 1B shows a perspective view of the system of FIG. 1A with the milling cutter being fitted to the guide piece, with the longitudinal axis of the milling cutter being pivoted relative to the longitudinal axis of the guide piece;

FIG. 2A shows an enlarged view of a longitudinal cross-section through the system shown in FIG. 1A in which the guide piece is fixed to a dental implant;

FIG. 2B shows an enlarged view of a longitudinal cross-section through the system shown in FIG. 1B in which the guide piece is fixed to a dental implant;

FIGS. 3A-C show transverse cross-sections of the guide portion of the head and the guiding portion of the cavity according to further embodiments of the present invention;

FIGS. 4A-D show alternative shapes of the guide portion of the head in accordance with further embodiments of the present invention;

DETAILED DESCRIPTION

Figure 5:
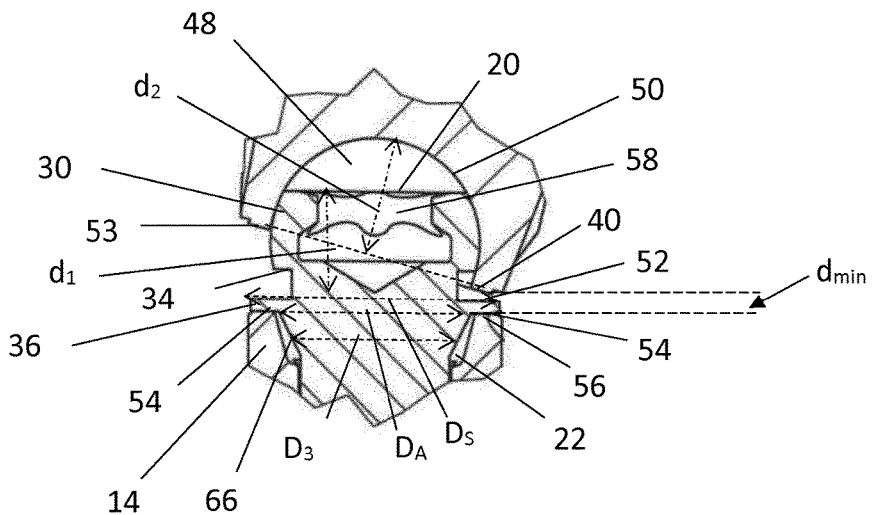
FIG. 5 shows detail X of FIG. 2B.

FIGS. 1A and 1B show a first embodiment of the system of the present invention for use in dentistry and dental implant procedures. The system includes a guide piece 10 and a milling cutter 12. The milling cutter 12 is used to remove bone from around the coronal aspect of the guide piece 10. In FIG. 1A the guide piece 10 and the milling cutter 12 are shown in separation, with the longitudinal axis $L_G$ of the guide piece 10 and a longitudinal axis $L_M$ of the milling cutter 12 aligned. The guide piece 10 includes a body portion 16 extending from an apical end 18 along the longitudinal axis $L_G$ towards a coronal end 20. The body portion 16 can be configured for insertion into a pre-drilled bore within the jaw bone of the patient, however in the present embodiment the body portion 16 is configured for insertion into a central aperture 22 of a dental implant 14 (see FIGS. 2A and 2B). The body portion comprises a fixation element in the form of external threads 24 for engaging with internal threads within the aperture 22 of the dental implant 14. The guide piece 10 further comprises a head 28 at the distal end of the body portion 16.

The head 28 includes a guide portion 31 which takes the form of a spherical segment, thus creating a frusto-spherical bearing surface 30. Head 28 further includes neck portion 32, located directly apical of the guide portion 31 and having a smaller diameter than the diameter of the apical end of guide portion 31, thereby forming an undercut 34. The neck portion 32 is coronally adjacent to an annular shoulder 36, which extends radially outward, perpendicular to the longitudinal axis $L_G$, and has a larger diameter than the maximum diameter of the guide portion 31.

The milling cutter 12 comprises an elongate shaft 38 extending from a proximal end 39 along the longitudinal axis $L_M$ towards a distal end 40. At said distal end 40 the milling cutter 12 comprises a milling part 42 including a plurality of circumferentially disposed cutting edges 44 for removing bone tissue. At the distal end 40, the milling cutter 12 comprises an inner cavity 48. Said inner cavity 48 has a concave hemispherical guiding portion 51 forming an abutting surface 50 and is configured to receive and house the guide portion 31 of the guide piece 10.

As shown in FIGS. 2A and 2B, the cavity 48 of the milling cutter 12 can be fitted over the guide portion 31 of the guide piece 10. When the guide portion 31 is fully inserted into the inner cavity 48, the abutting surface 50 abuts the bearing surface 30 of the guide piece's head 28. The abutting surface 50 and the bearing surface 30 have a matching spherical curvature (see also FIG. 5) and therefore permit the milling cutter 12 to be rotated about its axis $L_M$ and as well as allowing the longitudinal axis $L_M$ of the milling cutter 12 to be pivoted with respect to the longitudinal axis $L_G$ of the guide piece 10, as shown in FIGS. 1B and 2B.

As well as the continuous spherical abutting and bearing surfaces 50; 30 shown in the preferred embodiment, numerous alternative shapes of abutting and bearing surfaces are possible. FIGS. 3A-3C provide a small selection of alternative embodiments.

FIG. 3A provides an example in which the transverse cross-section of the guiding portion of the cavity 148, that is to say the cross-section perpendicular to the central axis $C_C$ of the cavity 148, is circular. This therefore provides a continuous circular symmetric abutting surface 150. In contrast the transverse cross-section of the guide portion 131 of the head, that is to say the cross-section perpendicular to the central axis of the head $C_H$, is hexagonal. This creates a discontinuous bearing surface 130 that contacts the abutting surface 150 at six discrete points about the circumference of the guide portion 131.

FIG. 3B provides an example of the opposite construction, in which guide portion 231 of the head has a circular transverse cross-section and thus forms a continuous bearing surface 230 whereas the cross-section of the guiding surface of the cavity 248 is polygonal (in this case octagonal) and thus forms a discontinuous abutting surface 250 with eight discrete contact points.

It is also possible for both the bearing and abutting surfaces to be discontinuous. An example is shown in FIG. 3C. Here guide portion 331 of the head has a transverse cross-section having a plurality of radial protrusions 329, the apexes of these protrusions forming a discontinuous bearing surface 330. The complementary guiding portion of the cavity 348 has a circular transverse cross-section 349 interrupted by circumferentially spaced grooves 347. The remaining segments of circular cross-section form the discontinuous abutting surface 350.

In all cases, the cooperating bearing and abutting surfaces of FIGS. 3A-3C enable relative rotation of the guide piece 10 and milling cutter 12 about their respective longitudinal axes $L_G$; $L_M$. The cavity 148, 248, 348 could be located in either the milling cutter 12 or guide piece 10, with the head being located in the other component.

The bearing surface of the present invention must be convexly rounded in the axial plane of the head. FIGS. 4A and 4B provide examples of a guide portion of a head having a discontinuous bearing surface. FIG. 4A shows the guide portion 431 having an octagonal transverse cross-section with the apexes of the octagon forming the bearing surface 430. FIG. 4B shows a guide portion 531 which has a transverse cross-section comprising a plurality of protrusions 529 forming bearing surface 530, interposed by rounded grooves 527. In both cases the bearing surface 430, 530 is continuous and spherical in the axial plane, thus forming a general "umbrella" shaped head. In FIG. 4C the guide portion 631 again has an octagonal transverse cross-section. Additionally however the guide portion 631 is also faceted in the axial plane. Hence the bearing surface 630 is formed by discrete, axially and circumferentially spaced points. In the axial plane the points follow an arc (shown in dotted lines), thus creating a convexly curved bearing surface 630.

Finally, FIG. 4D provides an example of a guide portion 731 of a head which is not spherical in the axial plane but is instead torodial. Here, bearing surface 730 is formed by an arc of curvature having a radius r. However, this radius is not centred on the central axis of the head $C_H$, but is offset from this. This results in a torodial bearing surface 730 and a planar surface 733 at the distal end of the bearing surface 730. This planar surface 733 could be used to form blind bore for cooperation with a screwdriver, or provide space for an axially extending through channel.

Figure 7:
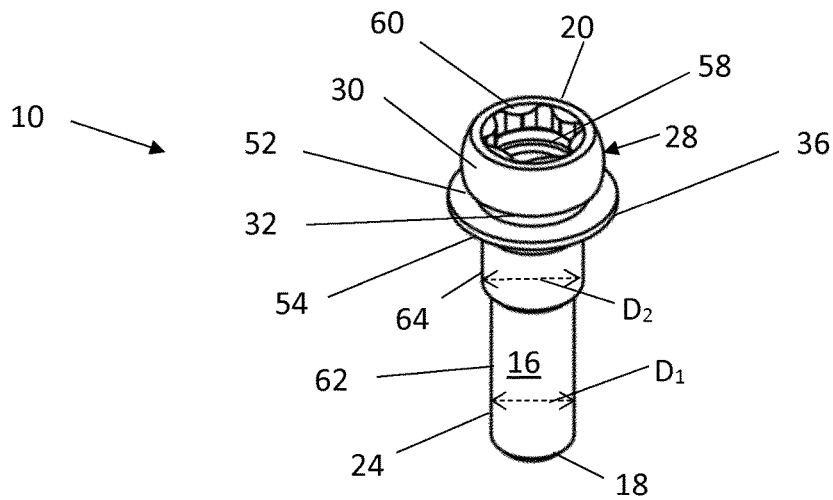
FIG. 7 shows an enlarged perspective view of the guide piece of FIGS. 1 and 2 in isolation.

Returning the preferred embodiment shown in FIGS. 1 and 2, as best seen in FIGS. 5 and 7, the annular shoulder 36 is interposed between the body portion 16 and the bearing surface 30 of the guide piece 10. Said shoulder 36 has two main functions: on the one hand it provides a first stop surface 52 for limiting the pivot angle α of the milling cutter 12 relative to the guide piece 10. To this end the first stop surface 52 cooperates with a second stop surface 53 provided by the distal end 40 of the milling cutter 12. The distance $d_1$ between the coronal end 20 of the guide piece 10 and the stop surface 52 is larger than the depth $d_2$ of the milling cutter's inner cavity 48. As such, if the milling cutter 12 and the guide piece 10 are in the engaged position and the longitudinal axis $L_G$ of the guide piece 10 and the longitudinal axis $L_M$ of the milling cutter 12 are aligned, the distal end 40 of the milling cutter 12 (second stop surface 53) is not in contact with the first stop surface 52. When pivoting the milling cutter 12 about the guide piece's head 28, the pivot angle α, which is the angle α in between the longitudinal axis $L_M$ of the milling cutter 12 and the longitudinal axis $L_G$ of the guide piece 10 becomes larger, whereas the minimal distance $d_{min}$ between distal end 40 of the milling cutter and the first stop surface 52 becomes smaller until they come into contact (see FIG. 5). At this point, the maximum pivot angle $α_{max}$ has been reached.

The other function of the annular shoulder 36 is the limitation of the insertion depth of the guide piece 10 into the aperture 22 in the dental implant 14.

Specifically, the annular shoulder 36 has a diameter $D_S$ that is larger than the diameter $D_A$ of the aperture 22 of the dental implant 14. On its underside, the annular shoulder 36 comprises a lower stop surface 54 that is shaped complementary to a coronal top surface 56 extending around the central aperture 22 of the dental implant 14. The guide piece 10 can thereby be inserted into the aperture 22 of the dental implant 14 until the lower stop surface 54 comes to rest on the coronal top surface 56. The lower stop surface 54 then prevents further insertion of the guide piece 10 and ensures that the head 28 protrudes sufficiently out of the implant 14 such that the distal end 40 of the milling cutter 12 can be fitted over it. In addition, by covering the coronal end of the implant 14, the annular shoulder 36 also protects the coronal top surface 56 of the dental implant 14 from the milling cutter 12.

As can also be seen in FIG. 5, the undercut 34 formed by neck portion 32 provides space for the distal end 40 of the milling cutter 12 to pivot into during use of the milling cutter.

Figure 6A:
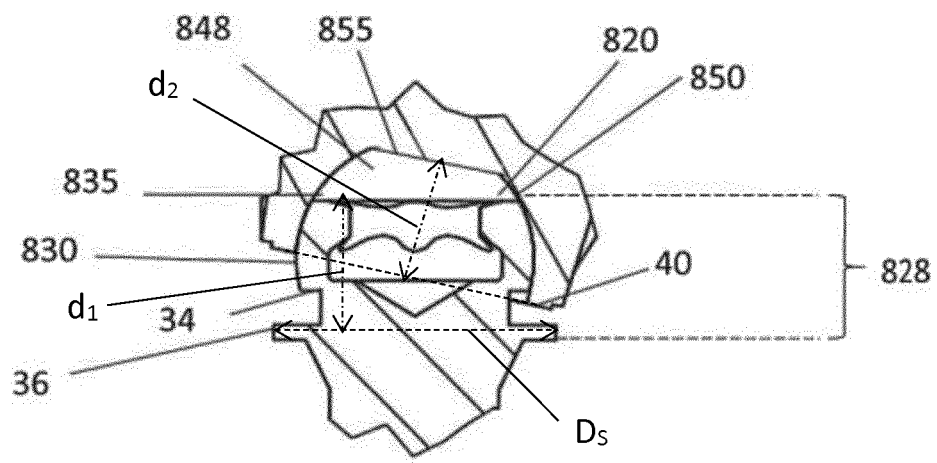
FIGS. 6A-B show alternative embodiments of the head and cavity of the system of the present invention.
Figure 6B:
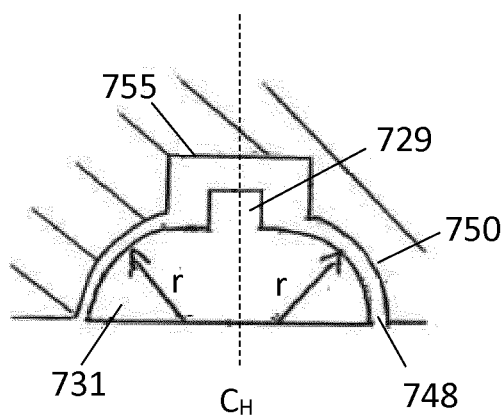

Alternative forms of stop surface are possible which fall within the scope of the present invention. FIGS. 6A and 6B provide examples of such alternative embodiments.

FIG. 6A is based on the cross section of FIG. 5. However, rather than abutting surface 850 having a hemispherical shape, this instead forms a spherical segment similar to that of bearing surface 830. The spherical segment forming the abutting surface 850 however, is truncated at the proximal end 855 at a point further from the centre of the base sphere than the distal truncation plane 835 of the bearing surface 830. This means that the cavity 848 can pivot around the head 828 until the proximal end 855 of the cavity abuts the distal end 820 of the head 828. In this embodiment therefore the stop surface of the milling cutter is formed by proximal end 855 of the cavity 848 and the stop surface of the guide piece by the distal end 820 of the head 828. Annular shoulder 36 acts only to protect the implant from the cutting edges 44 and to limit the insertion depth of the guide piece into the implant.

FIG. 6B comprises the guide portion 731 of the head shown in FIG. 4D, wherein the head further comprises an axially extending protrusion 729. The complementary cavity 748 comprises, proximal of the abutting surface 750, chamber 755. When the guide portion 731 is housed within the cavity 748 the protrusion 629 is accommodated within the chamber 755. The chamber 755 has a greater diameter than the protrusion 729 and thus the protrusion can move relative to and within the chamber until a predetermined pivot angle is reached, at which point the protrusion 729 will abut against the chamber 755 and prevent any further pivoting.

Returning again to the preferred embodiment of FIGS. 1 and 2, as is best visible in FIG. 7, the head 28 of the of guide piece 10 comprises a central blind bore 58, which is open toward the coronal end 20 and which has a non-circular symmetric cross-section 60 for cooperation with a torque imparting tool. In the shown embodiment the cross-section 60 has a Torx® screw drive shape. The internal Torx® screw drive shape of the guide piece's head 28 can thus be releasably connected to an external Torx® screw drive shape on a torque imparting tool, such as a screwdriver 82 (see FIG. 10A), to rotate the guide piece 10.

The guide piece 10 is integrally formed in one piece. As depicted in FIGS. 1A, 1B, 5 and 7, the body portion 16 of the guide piece 10 includes several portions with different diameters: a cylindrical first portion 62 extending from the apical end 18 and having a first diameter D1; a subsequent cylindrical second portion 64 located coronally of the first portion 62 and having a diameter D2; and a conical third portion 66 located coronally of the second portion 64 and running into the annular shoulder 36. Diameter D2 is larger than D1 and the diameter D3 of the third portion 66 increases in the coronal direction. The first shaft portion 62 is provided with external threads 24 for engaging with internal threads within the central aperture 22 of the dental implant 14.

Figure 8:
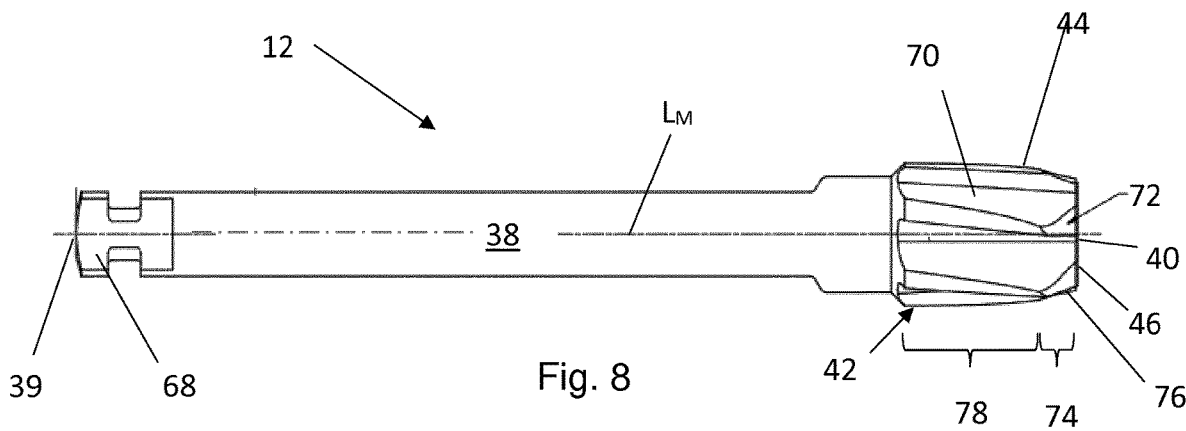
FIG. 8 shows an enlarged view of the milling cutter of FIGS. 1 and 2 in isolation.

FIG. 8 shows the milling cutter 12 of the preferred embodiment of FIGS. 1 and 2 in isolation. At the proximal end 39, the shaft 38 comprises a connection portion 68 for connecting to a motorized dental handpiece (not shown) for rotating the milling cutter 12. The cutting edges 44 of the milling part 42 are circumferentially spaced about the longitudinal axis $L_M$. The milling part 42 comprises a first cutting section 74, in which the cutting edges have an outward taper 76. Said taper 76 allows the formation of a tapered hole in the bone. In the shown embodiment the angle of the taper 76, relative to the longitudinal axis $L_M$ is 23°. The first cutting section 74 has a length (in the longitudinal direction) of about 0.8 mm. Proximally adjacent to the first cutting section 74 is second cutting section 78. The cutting edges 44 of the second cutting section 78 extend parallel to longitudinal axis $L_M$. In the shown embodiment, second cutting section 78 has a length of about 4.0 mm. The provision of this second cutting section 78 avoids removing an excess amount of bone when the milling cutter 12 is pivoted relative to the implant 14.

Figure 9:
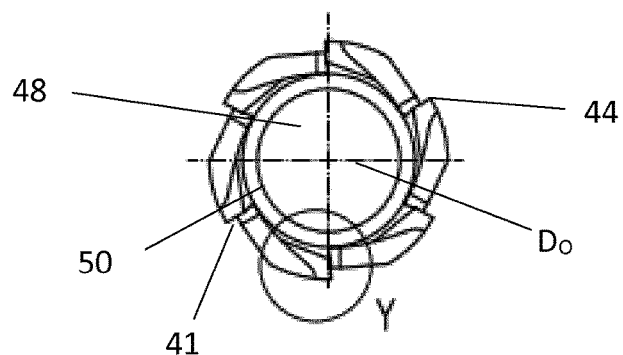
FIG. 9 shows a plan view onto the distal end of the milling cutter of FIG. 8.

FIG. 9 shows a plan view of the distal end 40 of the milling cutter 12. The cutting edges 44 are equally spaced along the outer periphery of the milling cutter 12. Cutting edges 41 are also formed on the distal end 40 of the milling cutter 12. The inner cavity 48 is centred on the longitudinal axis $L_M$ of the milling cutter 12.

Figures 10A, 10B, 10C:
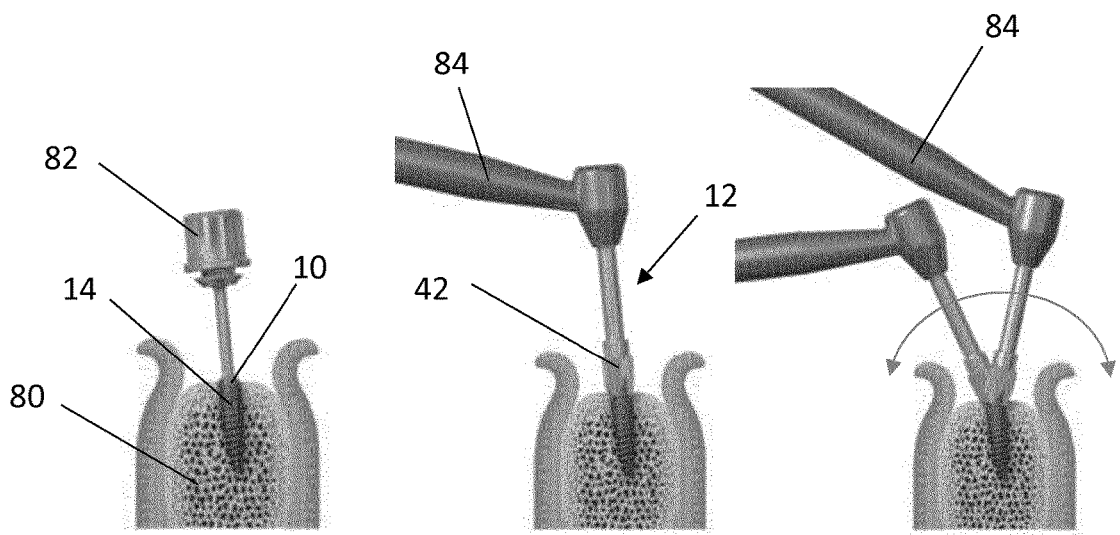
FIGS. 10A-G show different stages during a surgical procedure utilizing the system of the present invention for creating a non-symmetrical tapered opening in the bone coronal of a dental implant.
Figures 10D, 10E, 10F, 10G:
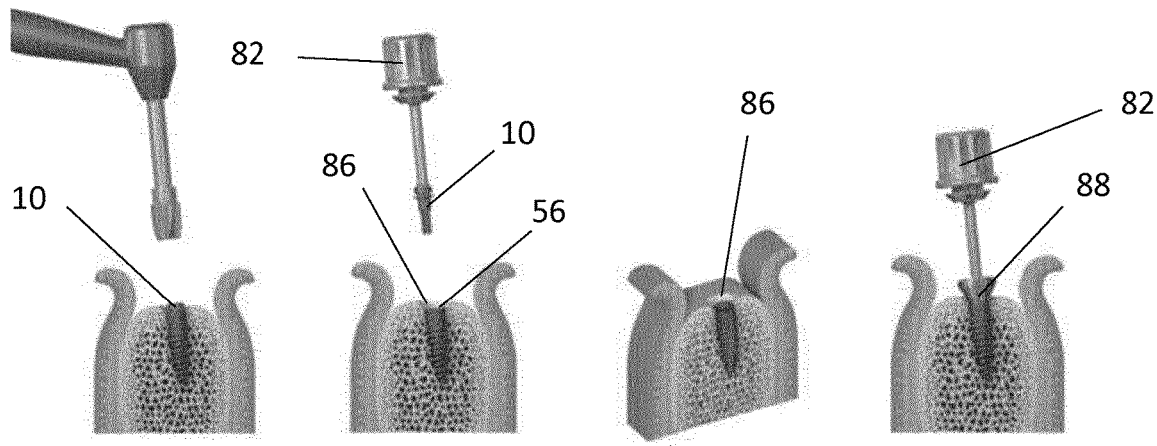

The use of the system described in connection with FIGS. 1 and 2 is illustrated in FIGS. 10A-10G, in which the guide piece 10 is screwed into the central aperture 22 of a bone level implant 14 anchored in a jaw bone 80 of a patient. A screwdriver 82 is used for screwing the guide piece 10 into the implant 14. The milling cutter 12 is then inserted into a dental handpiece 84 and, without rotation of the milling cutter 12, the distal end 40 of the milling cutter 12 is placed over the head 28 of the guide piece 10, whereby the guide portion 31 of the head 28 is fully inserted into the inner cavity 48 provided at the milling cutter's distal end 40. In this engaged position, the abutting surface 50 of the internal cavity 48 abuts the bearing surface 30 on the head 28 of the guide piece 10 and the milling cutter 12 can be pivoted with respect to the central axis $L_G$ of the guide piece 10 (and thus the central axis of the implant 14). The milling cutter 12 is maintained down on the head 28 by applying light pressure and rotated to cut away excess bone above the coronal end 56 of the dental implant 14 in order to provide sufficient space for an abutment with a non-circular cross-section to be connected to the implant 14. The milling cutter 12 remains coupled to the guide piece 10 during the milling operation. If the longitudinal axis $L_M$ of the milling cutter 12 is kept in alignment with the longitudinal axis $L_G$ of the guide piece 10 (FIG. 10B), a symmetrically centred, tapered hole can be formed in the bone around the dental implant 14. By tilting the milling cutter 12 slightly to one side, as shown in FIG. 10C, an asymmetric hole 86 can be created, such that an abutment with an asymmetrical cross-section can be fitted onto the implant 14. The shape of the hole 86 can therefore be adapted to substantially match the shape of the abutment or other component, e.g. healing cap 88, that is to be placed on the dental implant 14. Thanks to the annular shoulder 36 of the guide piece 10 covering the coronal top surface 56 of the dental implant 14, the milling cutter 12 can safely abrade the crestal bone around the implant 14 without the risk of cutting into the latter. Once a hole 86 with the desired shape and dimension has been provided, the milling cutter 12 is removed (FIG. 10D) and the guide piece 10 unscrewed from the implant 14 (FIG. 10E). Finally, the healing cap 88 or other component is placed and screwed into the implant 14, as shown in FIG. 10G.

The above described embodiments are for illustrative purposes only and the skilled person will realize that alternative arrangements are possible which fall within the scope of the claims. For example, the head may by formed on the milling cutter and the cavity in the guide piece. The bearing and abutting surfaces could be toroidal rather than spherical and may be discontinuous about their central axis or in the axial plane. The guide piece may be adapted for insertion into a bore hole in the bone and may comprise an alternative fixation element, such as a tapered section, through bore, or snap/friction fit means.

The invention claimed is:

1. A dental system comprising a milling cutter and a guide piece,
   the milling cutter comprising an elongate shaft extending along a longitudinal axis and a distal end portion including a milling part comprising at least one circumferentially disposed cutting edge for removing bone tissue,
   the guide piece extending along a longitudinal axis and including a fixation element configured to releasably fix the guide piece to a dental implant, wherein:

one of the guide piece and the distal end portion of the milling cutter comprises a head having a central axis coaxial to the longitudinal axis of said one of the guide piece and the distal end portion of the milling cutter, a different one of the guide piece and the distal end portion of the milling cutter comprises an inner cavity extending along a central axis coaxial to the longitudinal axis of said different one of the guide piece and the distal end portion of the milling cutter, said head comprises a guide portion having a bearing surface which is convexly rounded in an axial plane of the head, and is circular symmetric about the central axis of the head, said cavity comprises a guiding portion having an abutting surface which is concave in an axial plane of the cavity, and is circular symmetric about the central axis of the cavity, the cavity is sized and shaped to receive the guide portion of the head and the bearing surface and the abutting surface are configured to contact one another so as to permit simultaneous relative rotational movement between the head and the cavity about the central axis of the head and the central axis of the cavity, respectively, and pivoting of the longitudinal axis of the milling cutter with respect to the longitudinal axis of the guide piece, the milling cutter and guide piece comprise cooperating stop surfaces which, when they come into contact with one another, prevent further pivotal movement of the milling cutter relative to the guide piece, and the milling cutter is capable of pivoting with respect to the longitudinal axis of the guide piece in all directions around the longitudinal axis of the guide piece in a state in which the head is engaged with the inner cavity.

2. The dental system according to claim 1, wherein at least one of the bearing surface and the abutting surface respectively is continuous about the central axis of the head and the central axis of the cavity, respectively.

3. The dental system according to claim 2, wherein the bearing surface and the abutting surface respectively are continuous about the central axis of the head and the central axis of the cavity, respectively.

4. The dental system according to claim 1, wherein the bearing surface forms a continuous surface in the axial plane of the head between a proximal end and a distal end of the guide portion of the head, and/or the abutting surface forms a continuous surface in the axial plane of the cavity between a proximal end and a distal end of the guiding portion of the cavity.

5. The dental system according to claim 4, wherein both the bearing surface and abutting surface are continuous in the axial plane of the head and the axial plane of the cavity, respectively, over an axial extent of the guide portion of the head and an axial extent of the guiding portion of the cavity, respectively.

6. The dental system according to claim 1, wherein a cross-section of the bearing surface in the axial plane of the head forms an arc of curvature having a radius r.

7. The dental system according to claim 1, wherein the guide portion of the head is spherical in shape and the bearing surface is spherical over an axial extent of the guide portion.

8. The dental system according to claim 1, wherein a curvature of the bearing surface of the head in the axial plane of the head matches a curvature of the abutting surface of the cavity in the axial plane of the cavity.

9. The dental system according to claim 1, wherein the guiding portion of the cavity is spherical in shape and the abutting surface is spherical over an axial extent of the guiding portion.

10. The dental system according to claim 1, wherein the milling part comprises a first cutting section located at a distal tip of the milling cutter having at least one circumferentially disposed lateral cutting edge, the cutting edge tapering radially outwards in a proximal direction.

11. The dental system according to claim 10, wherein the milling part further comprises a second cutting section, located proximally of and adjacent to the first cutting section, the second cutting section having at least one circumferentially disposed lateral cutting edge in a number equal to the first cutting section, wherein the at least one lateral cutting edge of the second cutting section forms a continuation of the at least one cutting edge of the first cutting section, the at least one lateral cutting edge of the second cutting section having either a reduced outward taper in comparison to the at least one cutting edge of the first cutting section, an inward taper, or extends parallel to the longitudinal axis of the milling cutter.

12. The dental system according to claim 1, wherein the milling part comprises a plurality of circumferentially disposed cutting edges for removing bone tissue.

13. The dental system according to claim 1, wherein the head includes, proximal of the guide portion, an annular shoulder that provides a distally facing first stop surface having a diameter which is larger than a maximum diameter of the guide portion, and wherein a second stop surface is provided which extends radially outwards from a distal end of the cavity.

14. The dental system according to claim 1, wherein the guide portion of the head is located at a distal most end of the head and the guiding portion of the cavity is located at a proximal most end of the inner cavity.

15. The dental system according to claim 1, wherein the head comprises a neck portion located proximally adjacent to the guide portion and having a diameter which is smaller than a diameter of a proximal end of the guide portion, thereby forming an undercut.

16. The dental system according to claim 1, wherein the guide piece comprises a body portion, the body portion comprising said fixation element.

17. The dental system according to claim 16, wherein the fixation element comprises a threaded section.

18. The dental system according to claim 1, wherein in a state in which the guide piece and the milling cutter are coupled, the guide piece does not cover an outer surface of the milling part of the milling cutter in a radial direction orthogonal to the longitudinal axis of the guide piece.

19. A dental system comprising:
a milling cutter comprising an elongate shaft extending along a longitudinal axis and a distal end portion having a milling part comprising at least one circumferentially disposed cutting edge for removing bone tissue, and
a guide piece extending along a longitudinal axis and including a fixation element configured to releasably fix the guide piece to a dental implant, wherein:
the guide piece and the distal end portion of the milling cutter are configured to be coupled together so as to form a ball joint connection including a head and an inner cavity for receiving the head, said head comprises a guide portion having a bearing surface which is convexly rounded in an axial plane of the head, and is circular symmetric about a central axis of the head, said cavity comprises a guiding portion having an abutting surface which is concave in an axial plane of the cavity, and is circular symmetric about a central axis of the cavity, the cavity is sized and shaped to receive the guide portion of the head and the bearing surface and the abutting surface are configured to contact one another so as to permit simultaneous relative rotational movement between the head and the cavity about the central axis of the head and the central axis of the cavity, respectively, and pivoting of the longitudinal axis of the milling cutter with respect to the longitudinal axis of the guide piece, the at least one circumferentially disposed cutting edge of the milling cutter axially overlaps or is coronal of a pivot point of the ball joint connection in a state in which the guide piece and the distal end portion of the milling cutter are coupled together, the milling cutter and guide piece comprise cooperating stop surfaces which, when they come into contact with one another, prevent further pivotal movement of the milling cutter relative to the guide piece, and the milling cutter is capable of pivoting with respect to the longitudinal axis of the guide piece in all directions around the longitudinal axis of the guide piece in a state in which the head is engaged with the inner cavity.

* * * * *